United States Patent Office 3,591,666
Patented July 6, 1971

3,591,666
METHOD OF LOWERING THE TOXICITY OF ALKYL ESTERS OF O,O-DIMETHYLDITHIO-PHOSPHORYL-ALPHA-PHENYLACETIC ACID
Giovanno Pellegrini, Romano Santi, and Nicola Troiani, Milan, Italy, assignors to Montecatini Edison S.p.A.
Filed Jan. 9, 1967, Ser. No. 608,092
Claims priority, application Italy, Jan. 13, 1966, 618/66
Int. Cl. A01n 9/36; C07f 9/08
U.S. Cl. 260—990        1 Claim

ABSTRACT OF THE DISCLOSURE

Described is a method of lowering the toxicity of compounds of the formula:

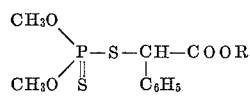

Figures 1, 2:
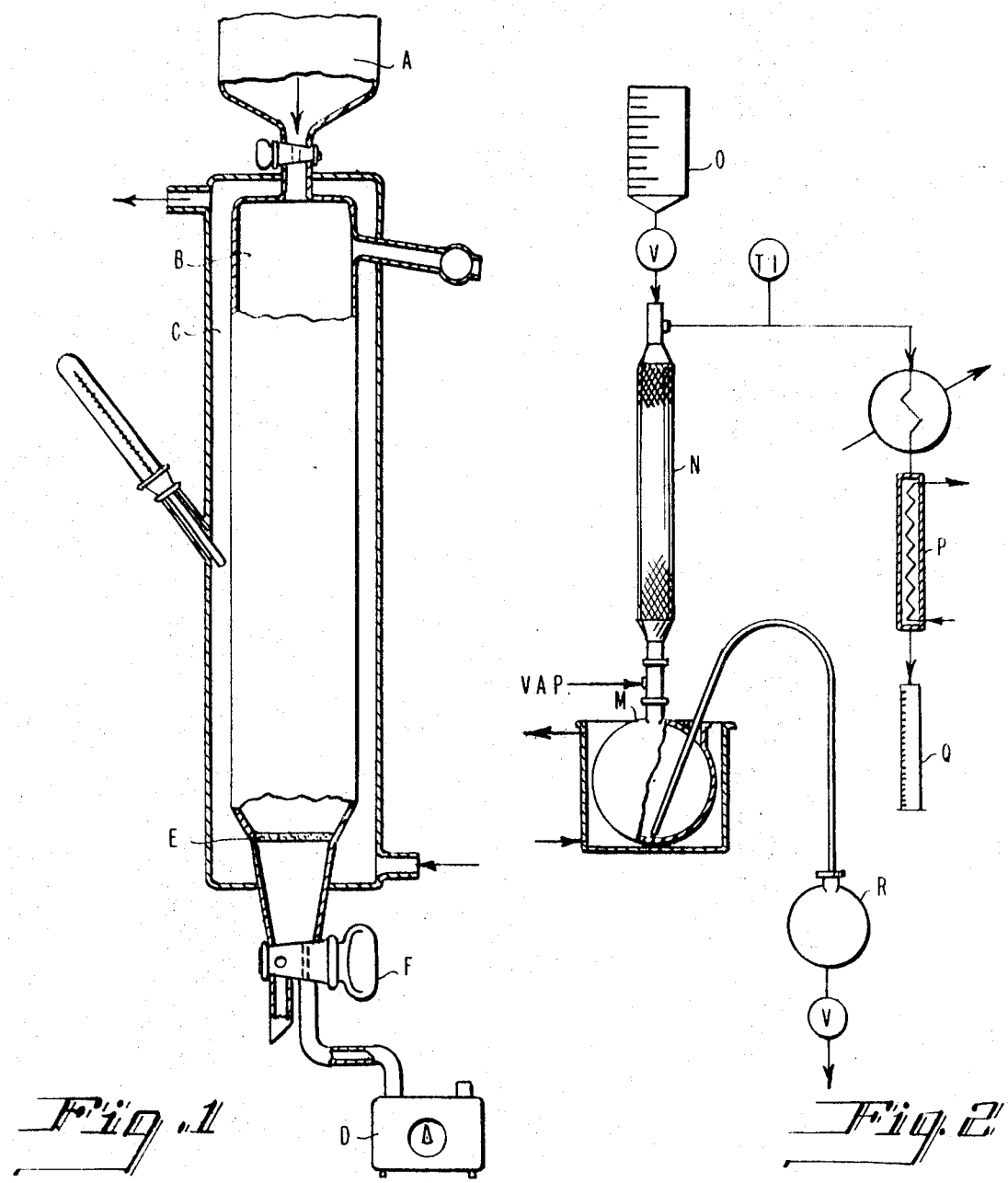

wherein R is linear or branched alkyl from 1 to 5 carbon atoms. The method comprises subjecting the compound to at least one distillation treatment in countercurrent vapor.

---

This invention relates to thiophosphoric esters and has as an object a method of preparation thereof whereby the products have considerably lower toxicity towards warm-blooded animals, together with improved purity. Another object is the obtainment of the products by said method.

In particular, the method of the present invention can usefully be employed on compounds of Formula 1:

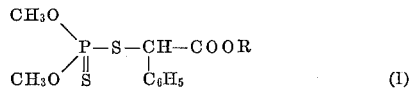  (1)

wherein R is a linear or branched hydrocarbon chain containing from one to five C atoms.

Pat. No. 2,947,662 teaches that compounds of the Formula 2:

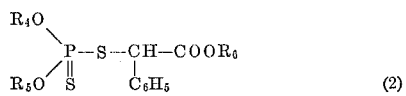  (2)

wherein $R_4$, $R_5$ and $R_6$ are the same or different, saturated or unsaturated, linear or branched alkyls, are efficacious against plant parasites.

It has now been found that among the compounds of Formula 2 only those compounds of Formula 1 can considerably be improved as regards their toxicity towards warm-blooded animals and their purity, if prepared according to the present invention.

It is well known to those skilled in the art that the evaluation of an antiparasitic compound takes into consideration not only its activity against parasites, but also its toxicity towards warm-blooded animals. In the latter aspect, not only the dangers which may be encountered in the handling of the compound during use are considered, but above all the effect which the residues of the antiparasitic substances on products destined for human consumption is considered.

In various countries, tolerance limits have been established for the residues of antiparasitic substances based upon the specific toxicity of each substance and other characteristics with respect to the conditions of use. Nonetheless, a considerable apprehension in this regard exists, as the cumulative effect of ingestion of even very small amounts of toxic substances over years can be deleterious and can vary from person to person. There is, therefore, a decided preference towards the use of substances which,
having equal efficacy, have the lowest toxicity towards warm-blooded animals.

Decreasing the toxicity to warm-blooded animals permits the utilization of the product in fields from which it would otherwise be excluded. It is therefore obvious that the discovery of a technique whereby the toxicity of an antiparasitic substance towards warm-blooded animals is considerably lowered represents an important contribution to the technical progress in this field.

Among the compounds of Formula 1, the ethyl ester of O,O-dimethyldithiophosphoryl-alpha-phenylacetic acid, obtained by the process according to U.S. Pat. No. 2,947,662 consisting in reacting an alkaline salt of O,O-dimethyldithiophosphoric acid with ethyl alpha-bromo-alpha-phenylacetate, has a toxicity per os on rat in LD 50 which varies between 50 and 300 mg./kg. The isopropyl ester of O,O-dimethyldithiophosphoryl-alpha-phenylacetic acid obtained by the same process has an LD 50 per os on rat of about 210 mg./kg.

According to a known process it is possible to increase the LD 50 of warm-blooded animals to thiophosphoric esters of Formula 1 to 1300 mg./kg. (The LD 50 has been determined by administering, by means of gastric sounding, increasing doses of the thiophosphoric esters to groups of 10 rats divided in equal parts into males and females having a weight of 100–1 10 g., so as to obtain lethal doses of about LD 10, LD 50 and LD 90. The LD 50 given herein is calculated by the usual statistical methods.)

At least one of the following impurities has been encountered in the above-mentioned thiophosphoric esters: alkyl α-bormo-α-phenyl acetates, O,O,S-trimethyldithiophosphate, alkyl phenylacetates, alkyl mandelates, etc. These substances are well known to have a low toxicity on rats per os (for instance O,O,S-trimethyldithiophosphate has an LD 50 of 900–1100 mg./kg., see J. Agr. and Food Chemistry, 7 (1959) 188–193; ethyl α-bromo-α-phenylacetate, 2000 mg./kg.). It is surprising therefore that by operating according to the present invention pure products can be obtained having an LD 50 on rat per os which can reach 2400 mg./kg.

The object of the present invention is to lower the acute toxicity of products of Formula 1. This is accomplished by treating said products with adsorbing means, preferably of polar nature, and/or subjecting them to a treatment to remove volatile substances, such as for instance vacuum distillation (vacuum distillation on a thin layer in Luwa type evaporators, vacuum distillation in a packed column or vacuum distillation by means of the bubbling of air through the product), distillation in vapor current or countercurrent.

The adsorbents which can be used are preferably selected among those having a polar character, such as for instance alumina, aluminum hydrosilicates, silica gel, activated clay, etc. This treatment can be carried out both on the products per se and on the products dissolved in a solvent. When operating in the presence of solvents, the solvents are preferably non-polar, such as carbon tetrachloride, dichloroethane, etc.

The removal of the complex of volatile impurities by vacuum distillation can be facilitated by bubbling air through the product. Moreover, volatile impurities can conveniently be removed by subjecting the solutions of the products in suitable solvents or the products as they are to stripping in a vapor countercurrent in a column.

In view of the fact that, generally, these thioesters have the tendency to decompose upon heating or because of hydrolytic phenomena, it was indeed surprising that they could tolerate stripping at about 100° C. in the presence of water vapor.

The stripping of the solutions can easily and usefully be inserted into the manufacturing process of these products, which can be obtained in the presence of a solvent. The stripping in vapor countercurrent can be with any suitable technical solution when carried out as a working phase. On the other hand, when desired to improve the purity and the toxicity towards warm-blooded animals of an end product, it is preferable to carry out the stripping on the products per se or to use other systems wherein it is not necessary to dissolve the product in a solvent.

When the thioesters possess a rather high toxicity towards warm-blooded animals (with LD 50 on rate per os up to about 300 mg./kg.) and when it should be desired to reach considerably lower toxicity levels, it is necessary to carry out both the removal of the volatile substances by means of the distillation methods indicated above, and the treatment with adsorbing means. The order of carrying out the two treatments is not material as far as the final results are concerned.

When the LD 50 on rat of the thioesters is above abou 300 mg./kg., it is possible to obtain good results regarding the decrease of the toxicity towards warm-blooded animals, by treating with adsorbing means only.

From the above statements it is obvious that the manner of carrying out the invention varies in accordance with the characteristics of the technical product on which it is operated and with the degree of toxicity which is desired to be reached.

In further describing the invention reference is particularly made to the ethyl ester of O,O-dimethyldithiophosphoryl-alpha-phenylacetic acid. This is not a limitation of the field of this invention as the other compounds of the Formula I behave the same way. For instance, an ethyl O,O - dimethyldithiophosphoryl - alpha - phenylacetate is treated having a titer of 92.6% and an LD on rat per os= 200 mg./kg.

The drawing illustrates apparatus which will be referred to hereinbelow with description of the invention.

FIGS. 1 and 2 describe apparatus for carrying out the stripping steps.

From what has been stated supra, the best results will be obtained by treating with adsorbing means and removing the complexes of volatile substances. Indeed, by carrying out a sole treatment with an adsorbing means, as will be described in the examples infra, a product is obtained which presents an LD 50 on rat per os of about 600 mg./ kg., while possessing an unchanged content of volatile substances.

One way to carry out the invention for a complete treatment will be described presently: In a first phase, air is blown through the product as it is. Apparatus as in FIG. 1 can be employed, while operating as follows. A product is introduced by doser A into column B until about half the height of the column is reached. A vacuum of about 14 torrs is established by circulation of water in the jacket C. The temperature inside the column is kept at 85°–88° C. Air is introduced from the meter D through the porous baffle E, keeping the vacuum at about 14 torrs. After a period of time, which varies in relation to the amount of air blown in the time unit, a product is obtained having a titer of about 96.6. At this point, the inflow of air is stopped, the vacuum removed and the product discharged through cock F. In a second phase, the product thus obtained is treated with an activated adsorbing earth whereby a product is obtained which presents an LD 50 per os on rat=1,000 mg./kg.

Another of the possible ways of working to realize the invention consists in treating a solution of the product in a solvent, for instance $CCl_4$, with an activated adsorbing earth. The solution is filtered, the cake is washed with $CCl_4$, the filtrate and washing liquid are collected together. This solution is passed to the stripping step, using an apparatus of the type of FIG. 2 in which the solution is fed by doser O to the head column N. At the base of the column, the vapor enters. In vessel M, the product is collected together with a little condensate water, which is eliminated in the separating funnel R, after separation by means of decantation. The solvent and the vapor are condensed by the condensing cooler P. The solvent and the water are collected in cylinder Q, where they are separated by means of decantation. The greater part of the volatile substances is contained in the solvent (which can be recovered by means of distillation) and a small part in the water.

The downflow of the solution from the doser and the vapor flow must be regulated in such a way that all the solvent is removed, without entrainments of product to the condensor. By means of the technique described, a product which presents a titer of 96.8% and an LD 50 per os on rat equal to 1,400 mg./kg. is obtained.

The same result is reached when reversing the order of the treatments.

When products of medium toxicity, for instance, having a purity of 95.9% and a LD 50=800 mg./kg. is available, treatment with an adsorbing means only produce a product having an LD 50=2,100 mg./kg.

For an exact evaluation of the technical importance of this invention, it is necessary to consider that is can be applied also to end products presenting unsatisfactory characteristics, since the removal of the complex of volatile substances raises the titer a.s., while it diminishes the toxicity towards warm-blooded animals and, therefore increases its merceological value, as does the further decrease of the toxicity towards warm-blooded animals obtained by treating with adsorbents.

Moreover, it has been verified that the products having a low toxicity towards warm-blooded animals, obtained according to the process of the present invention, have an activity towards insects and acari at least that of untreated products and higher when the purified product has a considerably higher content or active substance (a.s.).

The following examples are to be considered illustrative and not limitative of this invention.

EXAMPLE 1

100 parts by weight of technical ethyl O,O-dimethyldithiophosphoryl-alpha-phenylacetate having a titer of 92.6% and an LD 50 per os on rat of 220 mg./kg. are dissolved in 100 parts by weight of $CCl_4$. Added to the solution are 39 parts by weight of an adsorbing earth on the basis of aluminum hydrosilicate $Al_2O_3 \cdot 4SiO_2 \cdot H_2O$ (known in commerce by the trademark "Rumsil superattivato 11B." The entire mass is stirred at room temperature so as to keep the earth in suspension for two hours. It is left to settle for 96 hours and it is filtered. The cake is washed with 150 parts by weight of $CCl_.$. The solvent is removed from the mixed solvent and wash liquid by vacuum distillation at 40° C. The product obtained has a titer of 92.8% and a toxicity per os on rat of 600 mg./kg.

EXAMPLE 2

100 parts by weight of the starting product of Example 1 are dissolved in 500 g. of $CCl_4$. To the solution are added 300 parts by weight of alumina grade 1. The whole is stirred for two hours, filtered, and washed with 250 g. of $CCl_4$. The solvent is removed by means of vacuum distillation at 40° C. A product is obtained having a titer of 92.7% and a toxicity per os on rat=500 mg./kg.

EXAMPLE 3

To 100 g. of the starting product per se, of the preceding examples, 33 g. of "Rumsil superattivato 11B" are added. It is stirred for 2 hours at room temperature and left to rest for 96 hours. It is then separated to give a product having a titer of 93% and an LD 50 per os on rat of 550 mg./kg.

EXAMPLE 4

To 100 g. of the product per se of the preceding examples, 33 g. of alumina are added. It is stirred for 2 hours at room temperature and then separated. Titer 92.7%, LD 50 per os on rat=400 mg./kg.

EXAMPLE 5

100 g. of technical ethyl ester of O,O-dimethyldithiophosphoryl-alpha-phenylacetic acid, having a content of 95.9% of active substance and an LD 50 per os on rat= 800 mg./kg., are dissolved in 100 g. of CCl$_4$. 39 g. of Rumsil are added to the solution. After 2 hours of stirring and 96 hours of rest, it is filtered, the cake is washed with 150 g. of CCl$_4$, and the solvent is removed by vacuum distillation at 40° C. The product obtained has a titer= 96% and an LD 50 per os on rat=2,100 mg./kg.

EXAMPLE 6

100 g. of technical ethyl ester of O,O-dimethyldithiophosphoryl-alpha-phenylacetic acid containing 92.6% of active substance, which presents an LD 50 per os on rat=220 mg./kg., are dissolved in 100 g. of CCl$_4$. 39 g. of Rumsil (see Example 1) are added to the solution. The solution is kept in agitation at room temperature for 2 hours, and left to rest for 96 hours. It is filtered and the cake is washed with 150 parts by weight of CCl$_4$. Filtrate and washing liquid are collected together and the whole is subjected to distillation in a column with countercurrent vapor. A product is obtained having a purity of 96.8% and presenting an LD 50 per os on rat=1,400 mg./kg.

EXAMPLE 7

100 g. of the starting product of Example 6 are kept at a temperature of 85°–88° C. by circulation of hot water, in a glass column with a porous bottom. Air is bubbled through the porous baffle of the bottom, while maintaining a residual pressure of 14 torrs, with an air downflow of 29 liters per hour, continued for 5 hours. A product is obtained having a purity of 96.6% and an LD 50=400 mg./kg.

The thus treated product is dissolved in CCl$_4$. 39 g. of Rumsil are added. The solution is kept in agitation for 2 hours. It is left to rest for 96 hours and washed with 150 g. of CCl$_4$; the solvent is removed under vacuum at 40° C. The product obtained has a titer of 96.8% and an LD 50 per os on rat=1,200 mg./kg.

EXAMPLE 8

By operating on the starting product of Example 7 and according to the same modalities, but employing silica gel, a product is obtained having a titer of 96.8% and an LD 50 per os on rat=1,400 mg./kg.

EXAMPLE 9

Operating on the starting product of Example 7, the complex of volatile substances is removed from the product per se by blowing in air at 85°–88° C., operating according to the modalities described in Example 7.

100 g. of the product thus obtained are dissolved in 500 g. of CCl$_4$. 100 g. of attapulgite are added to the solution which is kept in agitation for 2 hours and left to rest for 96 hours. It is filtered and washed with 250 g. of CCl$_4$, the solvent is eliminated under vacuum at 40° C. A product is obtained having a purity of 96.5% and an LD 50 per os on rat=1,300 mg./kg.

EXAMPLE 10

100 g. of a product, containing 92.6% of the isopropyl ester of O,O-dimethyldithiophosphoryl-α-phenylacetic acid and having an LD 50 per os on rat=210 mg./kg., are dissolved in 500 g. of CCl$_4$. 300 g. of activated adumina are added to the solution which is then stirred for 2 hours at room temperature, filtered, and washed with 250 g. of CCl$_4$. Filtrate and washing liquid are collected together. The solvent is removed by distillation in vapor countercurrent in a column. A product is obtained having a purity of 96% and an LD 50 per os on rat=2,000 mg./kg.

EXAMPLE 11

100 parts by weight of a product, containing 94.5% of isopropyl ester of O,O - dimethyldithiophosphoryl-alpha-phenylacetic acid which presents an LD 50 per os on rat=1,300 mg./kg., are dissolved in 500 g. of CCl$_4$. 300 g. of activated alumina are added to the solution, which is then stirred for 2 hours at room temperature, filtered and washed. The solvent is removed by distillation at 40° C. at reduced pressure. A product is obtained with a titer of 94.8% and an LD 50 per os on rat=2,400 mg./kg.

EXAMPLE 12

A product, containing 93.8% of the methyl ester of O,O - dimethyldithiophosphoryl-alpha-phenylacetic acid and having an LD 50 per os on rat of 500 mg./kg., is treated with activated alumina according to Example 11. Filtrate and washing liquid are collected together. The solvent is removed by vacuum distillation at 40° C. The product obtained has a titer of 94% and an LD 50 per os on rat=1,500 mg./kg.

EXAMPLE 13

100 g. of a product, containing 89.8% of ethyl ester of O,O-dimethyldithiophosphoryl-alpha-phenylacetic acid, with an LD 50=205 mg./kg., are kept at a temperature of 85°–88° C. by circulation of hot water in a glass column with a porous bottom. Air is bubbled through the porous baffle of the bottom, while maintaining a residual pressure of 14 torrs, with a downflow of air of 81 l./hour for 3 hours. A product is obtained having a titer of 97.8% and an LD 50 of 500 mg./kg. The product thus treated is dissolved in 350 g. of CCl$_4$. 100 g. of Rumsil are added. The whole is agitated for 2 hours before being left to rest for 96 hours, filtered and washed with 150 g. of CCl$_4$. The solvent is removed under vacuum at 40° C. The product obtained has a titer of 97.9% and an LD 50=1,350 mg./kg.

EXAMPLE 14

100 g. of ethyl ester of O,O-dimethyldithiophosphoryl-alpha-phenylacetic acid having a purity of 92.9% and an LD 50 per os on rat=1,190 mg./kg. are dissolved in 160 g. of dichloroethane. 39 of Rumsil are added to the solution. After 2 hours of stirring and 96 hours of rest, it is filtered; the cake is washed with 200 g. of dichloroethane and the solvent is removed by vacuum distillation at 40° C. The product obtained has a titer of 93.2% and an LD 50=1,800 mg./kg.

EXAMPLE 15

100 g. of a product having a titer of 89.8% of ethyl ester of O,O-dimethyldithiophosphoryl-alpha-phenylacetic acid with an LD 50=205 mg./kg., are kept, at a temperature of 85°–88° C. by circulation of hot water, in a glass column with a porous bottom. Through the porous baffle of the bottom air is bubbled, maintaining a residual pressure of 14 torrs, with an air downflow of 81 l./hour for 3 hours. A product is obtained having a titer of 97.8% and an LD 50=500 mg./kg.

To 100 g. of this product, 35 g. of Rumsil are added and the whole is kept at a temperature of 60° C. for 4 hours. After filtration, a product is obtained having a titer of 97.9% and an LD 50 of 1000 mg./kg.

We claim:
1. The method of lowering the toxicity of compounds of the formula:

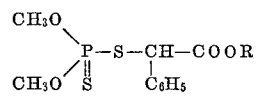

wherein R is linear or branched alkyl from 1 to 5 carbon atoms, which comprises subjecting the compound to distillation treatment in counter-current vapor.

References Cited

UNITED STATES PATENTS

| | | | |
|---|---|---|---|
| 3,439,070 | 4/1969 | Losco et al. | 260—941X |
| 2,494,310 | 1/1950 | Plueddemann | 260—990X |
| 2,605,279 | 7/1952 | Edwards et al. | 260—990 |
| 2,947,662 | 8/1960 | Fusco et al. | 260—941X |
| 3,076,009 | 1/1963 | Schrader et al. | 260—941 |
| 3,185,723 | 5/1965 | Floyd | 260—941 |

CHARLES B. PARKER, Primary Examiner

A. H. SUTTO, Assistant Examiner

U.S. Cl. X.R.

202—205, 234; 203—49, 91; 260—941; 424—217